United States Patent Office

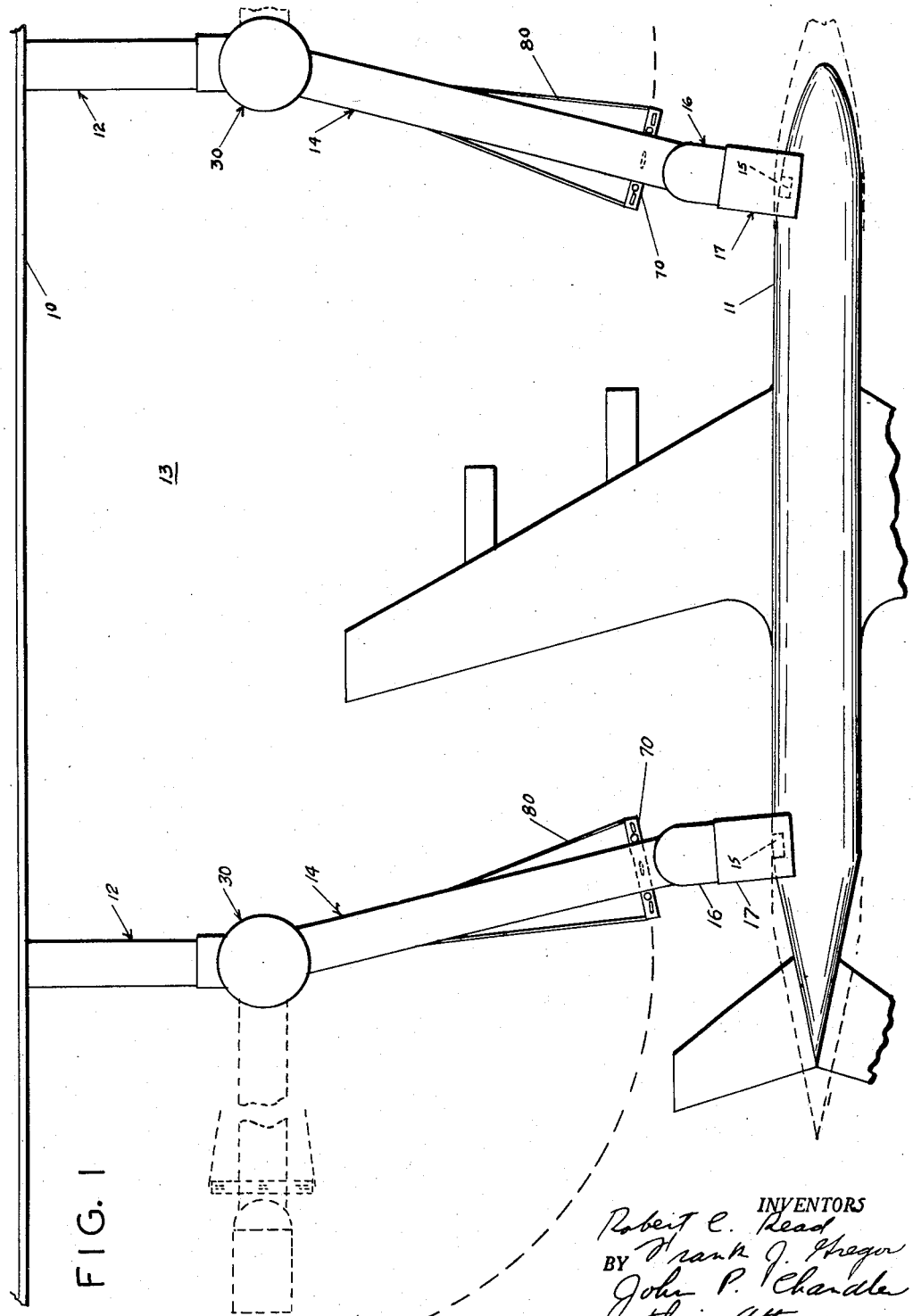

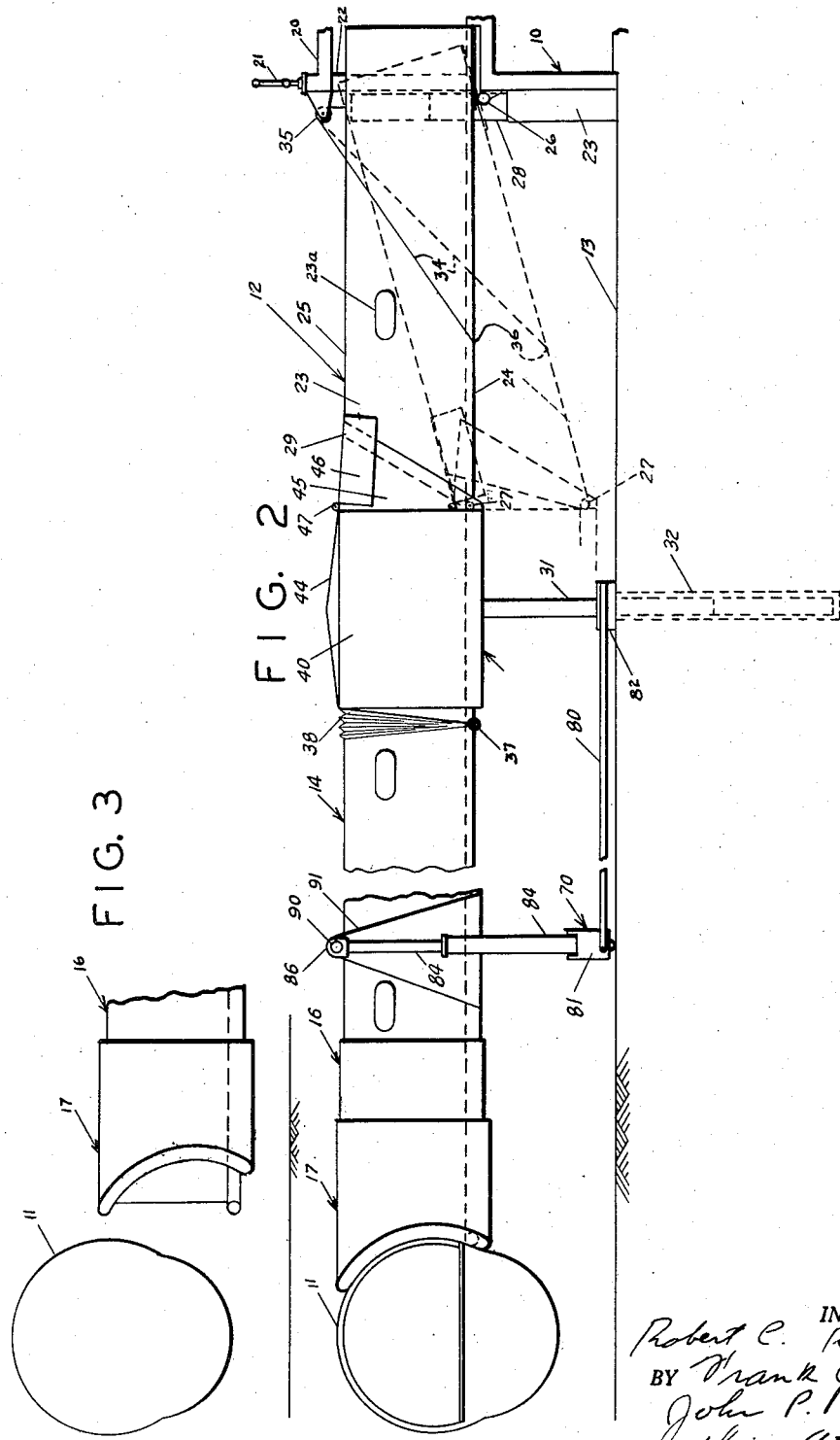

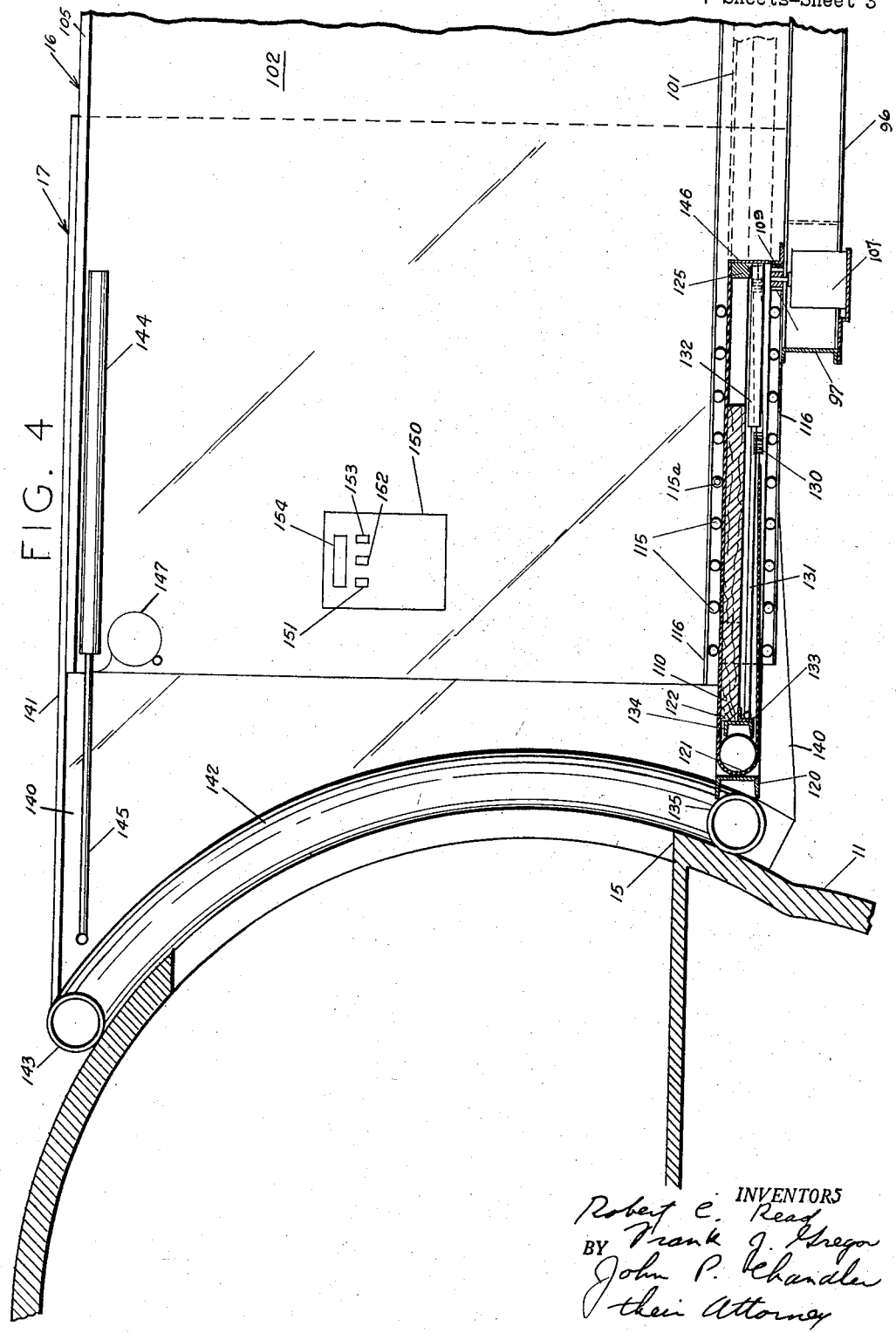

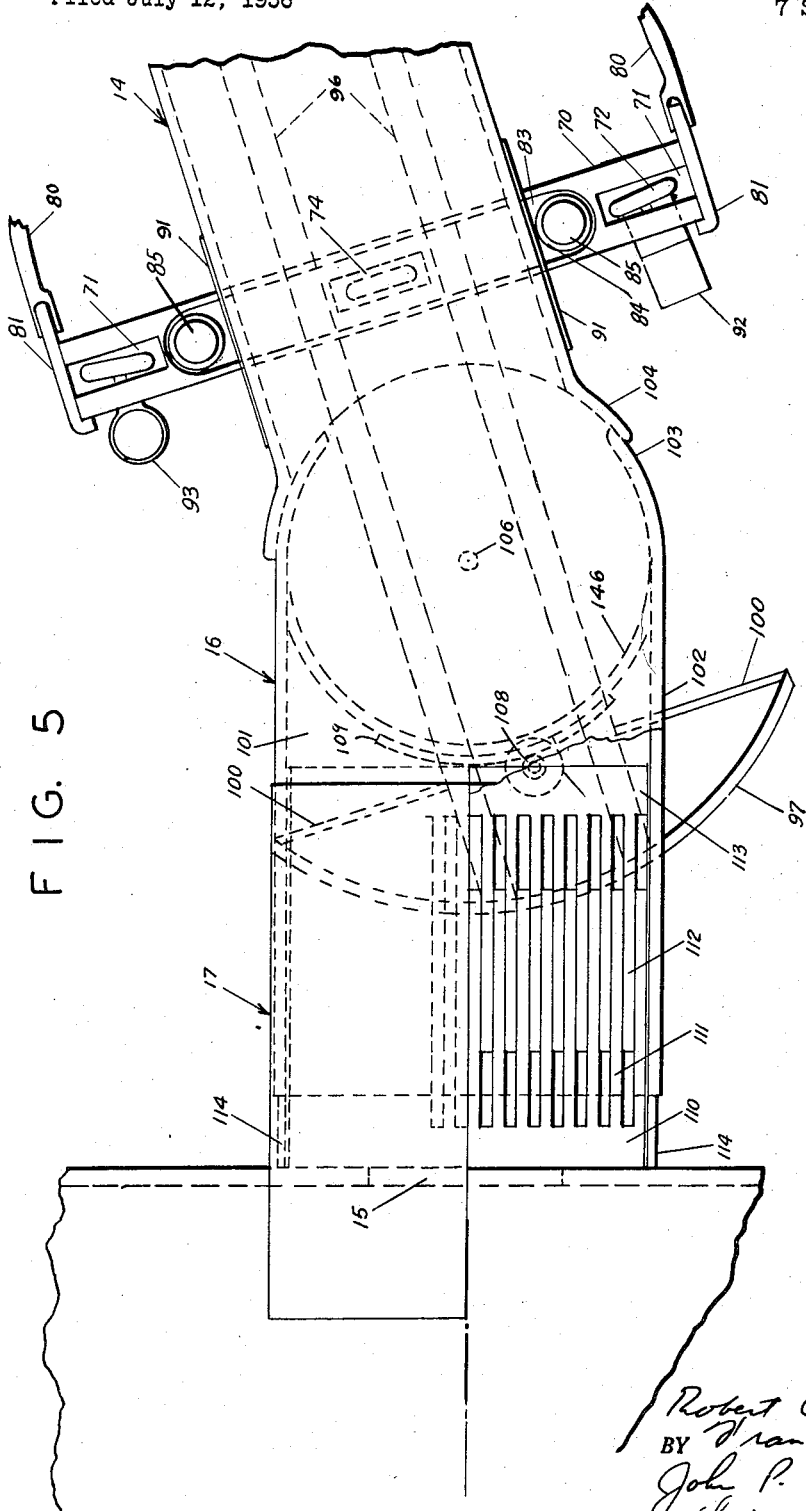

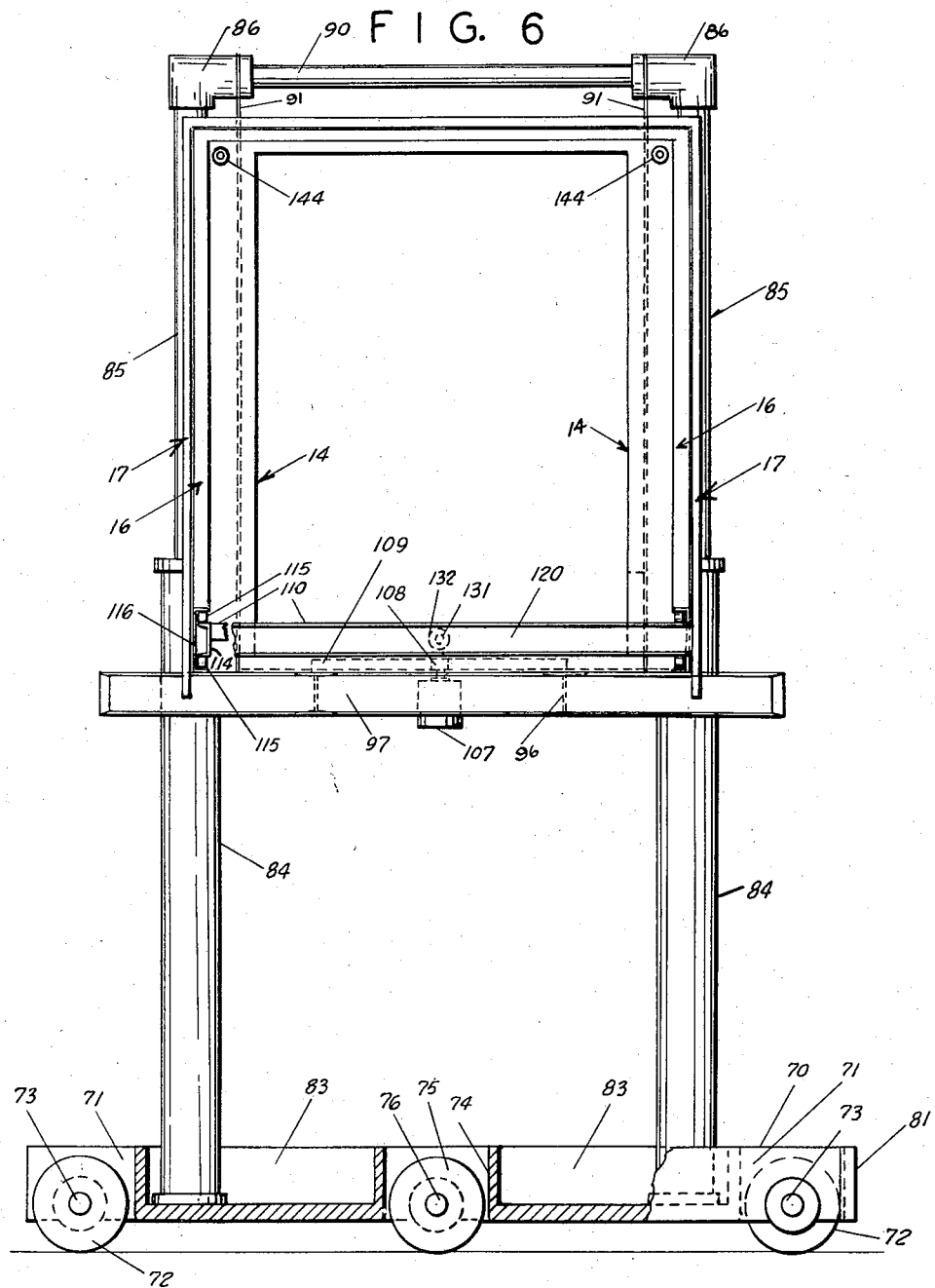

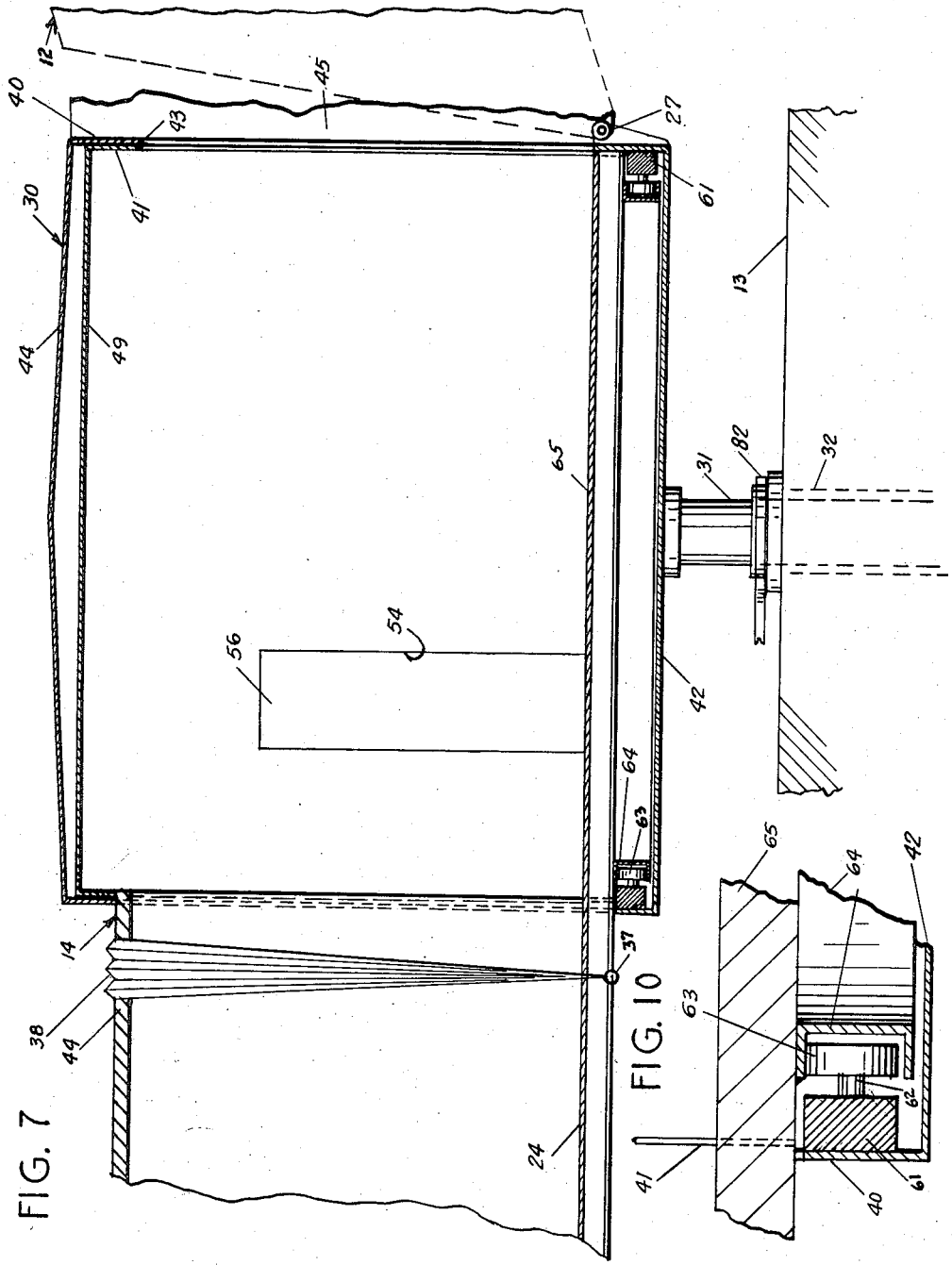

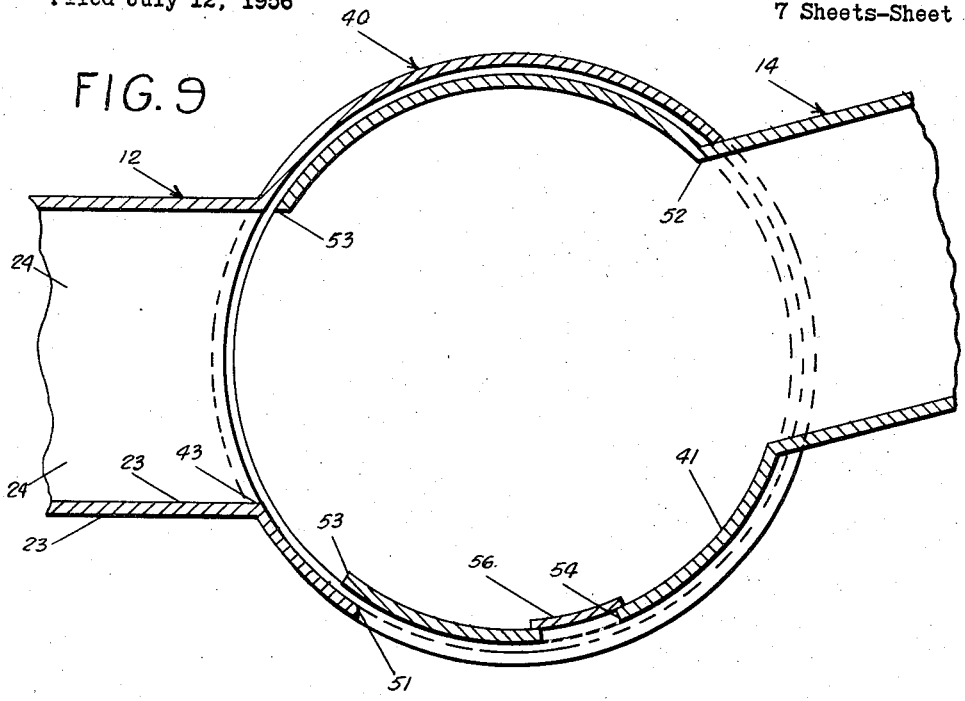
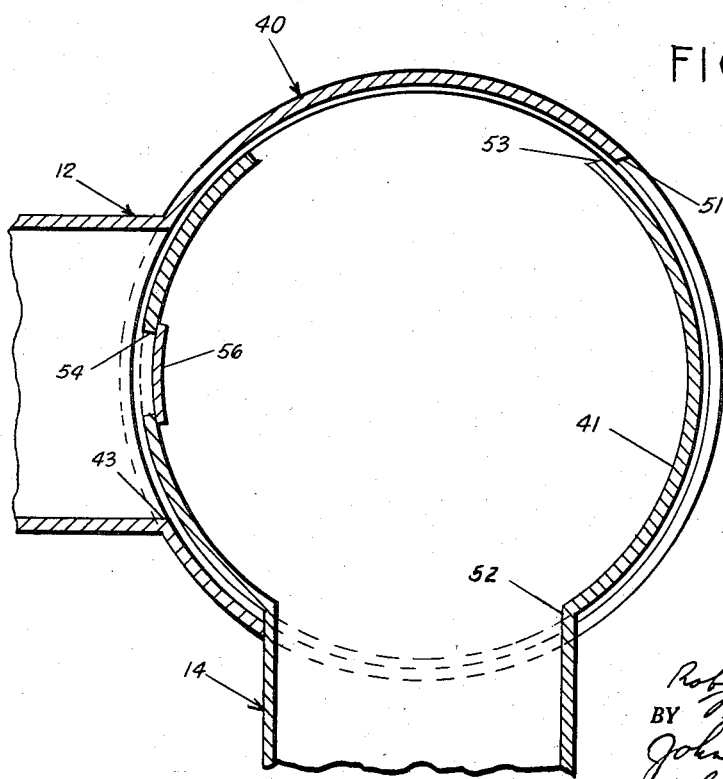

2,875,457
Patented Mar. 3, 1959

2,875,457

AIRCRAFT LOADING AND UNLOADING RAMP

Robert C. Read, Wilton, Conn., and Frank J. Gregor, Freeport, N. Y., assignors to James V. Taylor and Charles E. Morgan, copartners doing business as Rockport Industries Fund, Montreal, Quebec, Canada Application July 12, 1956, Serial No. 597,447

11 Claims. (Cl. 14—71)

This invention relates to apparatus for loading and unloading aircraft at airports, and relates more particularly to a novel enclosed mobile passageway comprising a plurality of ramps, for passengers or cargo and service facilities which permits the expeditious and accurate alignment of the outer end of the ramp with the door, or doors, in the grounded aircraft and the prompt handling of passengers or cargo and services between the aircraft and the airport terminal building.

An important object of the invention is to provide a mobile ramp which permits quick removal of the ramp when it is not in use to a location where it will not interfere with docking or departure of the aircraft, under its own power or by tug or other separate means, in or from its designated, grounded location.

Another important object of the invention is to provide ramps which, when installed in pairs with the mobile outer sections constructed so that they rotate away from each other into their non-service positions, can quickly and conveniently service the larger turbo-jet aircraft with two passenger openings, one forward of the wing and one to the rear of the wing, scheduled for operation in the near future. In practice, after such large planes have been docked under their own power, or by tug or other external means, the movable sections of the two ramps will be rotated outward and toward each other from their lowered and retracted positions and, when approximately opposite the doors, the outer movable sections and the outer end of the inward fixed sections of each ramp will simultaneously be raised to the desired height, following which the extensible sections at the outer end of the ramp can be extended to provide the desired weather-tight seal against the side of the aircraft fuselage. The provision of means, hydraulic or otherwise, for raising and lowering the ramp structure serves two vital needs: first, provision is thereby made for accurately positioning the outermost end of the ramp floor in correct horizontal relationship to the sill of the aircraft door and, second, by sufficiently lowering the ramp structure, the movable section of the ramp servicing the aircraft doorway located to the rear of the aircraft wing can be rotated away from the wing into non-service position and, in this lowered position, it easily will pass under the horizontal tail assembly of the aircraft. Meanwhile, if the aircraft is of an advanced type with a second passenger door forward of the wing, the forward ramp simultaneously can be rotated away from the wing into non-service position and, even should aircraft of the future attain greatly increased wing span, the ramp servicing the forward door can also be lowered sufficiently so that the wing tip and a considerable portion of the wing outboard of the outermost power nacelle can pass over the lowered portion of the ramp structure in its out-of-service position. Thus it is seen that this ramp structure, singly or in pairs, can service aircraft of virtually all types presently in widespread service as well as all types now planned for the future with a single door either forward or behind the wing or with two doors positioned on either side of the wing, even though these paired doors may be as much as 30 feet further apart in later and larger versions. Also, when the ramp structures are in non-service position, cargo or transport aircraft of any present or known future design can either dock or depart under their own power without danger of interference with the ramp structure. These features of adaptability, coupled with the wide range of vertical movement in the ramp structure provided by the present invention combine to furnish important and very desirable degrees of flexibility assuring both a long useful life for each ramp and maximum hour-to-hour utilization of each installation, since almost any type of aircraft now in use and all types planned for the foreseeable future can be docked and serviced at any paired installation.

Another important object of the invention is to provide a mobile ramp which, when in its out of service position is kept away from the buildings so as to interfere as little as possible with the essential ground vehicle storage and traffic in the area adjacent to the airport buildings.

Another important object of the invention is to provide a novel completely enclosed and weatherproof ramp to permit passengers and personnel or cargo to pass to or from the aircraft and the airport terminal building without the necessity of climbing steps or steep inclines or going into the open.

Another object of the invention is to provide weatherproof means for unloading and loading of the various items essential to passenger service by means of lines and ducts which may easily be suspended under the ramps, to provide ready connection to the airport and for the quick and convenient connection to the aircraft of various services such as electric, hydraulic or pneumatic power, warm or cool air conditioning, water, music, public address system lines, telephone lines and the like.

A further object of the invention is to provide a power driven ramp structure having a suitably located operating control panel to permit one man interlocked operation of all the functions of the several sections of the ramp.

Yet another object of this invention is to provide a novel multi-sectioned ramp structure in which the first or inner ramp section which extends from the airport terminal building shall have its inner or building end freely supported on a transverse roller at the building opening and its outer end attached by a transverse horizontal hinge element to the vertical exterior cylinder of a circular turret which can be raised or lowered vertically by the piston of a hydraulic ram whose cylinder is fixed below ground and to which the turret is rigidly attached, a second or intermediate ramp section attached by a transverse horizontal hinge element at its inner or turret end to the vertical interior and rotatable cylinder of the turret and its outer end suspended by a transversely hinged linkage carried by a transverse element between the tops of the pistons of two hydraulic rams, the latter hydraulic rams being carried in turn by a novel power driven mobile wheeled carriage or dolly attached by radius rods to a collar free to rotate above the top of the fixed cylinder of the hydraulic ram supporting the turret. The intermediate or second ramp section may in consequence be rotated in a horizontal plane about the vertical center line of the turret as an axis by the radial movement of the carriage or dolly. The ramp structure further includes a novel third or outer ramp section, carried by the second ramp section, but pivoted to the second ramp section by a vertical pivot pin permitting the third ramp section to have limited horizontal powered rotation with a weather sealed joint relative to the second ramp section, and equipped at its outer or free end with a novel telescopic, powered, extensible floor section and a separate powered, extensible hood, both equipped with suitable sealing means, whereby, when all sections of the ramp structure are properly aligned as to height and horizontal disposition relative to the aircraft door, the floor extension and the extensible hood of the third ramp section may be extended to provide a weather sealed contact with the plane fuselage and around the open plane door, thus permitting weather sealed ingress or egress between the interior of the plane and the interior of the airport terminal building, through the interior of the ramp structure covered by the present invention.

In the drawings:

Fig. 1 is a plan view of two complete paired units of the apparatus of the present invention and showing the application of the outer ends thereof to a standard type of commercial aircraft scheduled for service in the near future.

Fig. 2 is a broken side elevation of one of the ramp units.

Fig. 3 is a broken side elevation of the third extensible ramp of one unit showing its manner of approach to the aircraft.

Fig. 4 is a broken central vertical section taken through this outer extensible portion.

Fig. 5 is a plan view of the outer end of the third ramp, showing its mobile supporting carriage, and showing the outer rotatable and extensible portions, with parts broken away to show the interior arrangement of the slidable extensions which contact the plane.

Fig. 6 is an elevation of the outer end of the third ramp and showing, partially in section, certain details of the construction of the mobile carriage or dolly supporting the second ramp, and a cut away view of the extensible floor.

Fig. 7 is a section taken through the turret which connects the first and second ramps, the former, in inclined position, being indicated by dotted lines, the latter being shown in extended position and the horizontal hinging of both ramps relative to the turret being indicated.

Fig. 8 is a horizontal section taken through the turret and showing the relative position of the first and second ramps when the apparatus is retracted and not in use.

Fig. 9 is similar to Fig. 8 but shows the position of the second ramp when it is swung to maximum outward position.

Fig. 10 is an enlarged section at the floor of the turret showing the manner of rotatably mounting inner cylindrical housing section relative to the outer housing section of the turret.

In Fig. 1 there is illustrated a portion of an elevated two level dock 10 forming a part of the airport terminal building and a two door aircraft of advanced design 11 grounded in its delegated position relative to the dock. There is also shown in broken lines a turbo-jet type aircraft of greater length than the one shown in full lines. Fig. 1 shows that the ramp structures of the present invention can be used in pairs with aircraft having two passenger doors that vary in distance apart by as much as thirty feet. Also, a single ramp installation (not shown) can be used to service all aircraft now in service and having single side doors closed by side-hinged or sliding doors, such as the several models of the Constellation, the DC-4, DC-6 and DC-7 models, the Vickers Viscount, most multi-engined European models; with the addition of a small portable "gangplank" to reach from ramp end to one of the lower steps of the Convair's self-contained stairway, this model, too, can be serviced. Paired ramp installations will service the Boeing 707 and its several larger "Intercontinental" models, the Douglas DC-8 and the Convair "Skylark"; all of these latter aircraft being turbo-jet powered and with seating planned for from 110 to 215 passengers, which has, in each instance, necessitated two side doors to handle the emplaning and deplaning traffic.

The dock 10 is of common design and height so that an inner or first ramp 12 enters the face of the dock at second-story level, the customary level for passenger traffic in almost all recently constructed airports. The ground or apron 13 in front of the dock is paved, permitting smooth and substantially level arcuate travel of the wheeled carriage or dolly carrying the outer end of a second ramp 14 thereover.

The particular aircraft shown is of advanced turbo-jet design and has two passenger doors 15 located just beyond the opposite ends of the straight portion of the fuselage. In other words, these doors are positioned at the beginning of the tapered fuselage section. At the outer end of the second ramp there is provided a pivoted, extensible third ramp 16, the extensible sections thereof being shown at 17 and the outer ends thereof contact the curved side walls of the fuselage adjacent to the door openings. It will also be noted from Fig. 2 that modern aircraft doors are located a considerable distance above the ground. The ramp structures in this present invention will accommodate all existing and anticipated door elevations.

Slidable extension 17 which is essentially an extensible protective weather canopy is carried by the pivoted third ramp 16, both of which are longitudinally aligned at all times and the unit 16—17 is pivotally supported at its inner end by the outer end of second ramp 14 in order to give the extension unit 17 the proper angle of approach to the door which, as earlier stated, may be disposed at an angle to the longitudinal axis of the craft. This feature serves two important purposes. First, since in the future and because of the curvature of the fuselage surface, the upper edges of doors will lie considerably further inboard than the door bottoms, provision must be made to retract the ramp's weather seal above the aircraft door several feet before it can clear the side of the fuselage when the ramp structure is lowered prior to retraction into non-service position. Second, some leeway must be given the pilot or tug operator when positioning the aircraft and by use of the extensible protective weather canopy and the extensible outer portion of the floor, means are provided in the present invention to accommodate a difference of one or two feet plus or minus the "Standard" parking position of the aircraft relative to the airport terminal building. These extensible sections of the ramp also provide the flexibility necessary to service two-door aircraft without difficulty even when the aircraft has come into rest in a position not exactly parallel to the airport terminal building.

The dock 10 (Fig. 2) may have the usual observation platform 20 and passenger railing 21 and is provided with an opening 22 for first ramp section 12. The lower end of this opening is preferably about the same height above the ground as the average height of doorsills in grounded craft since one of the objects of the invention is to enable passengers to leave and enter the craft by walking on a level passageway floor or up or down very moderate ramp inclines. First ramp 12, which preferably is rectangular in cross section, may be of conventional construction with opposed side walls 23, windows 23A, a base wall 24 and a roof 25. At its inner end it is mounted on a roller 26 secured to the dock along the lower end of opening 22. At its outer end the ramp is pivotally supported on a horizontal shaft 27 secured to a turret 30.

The turret is supported by a power actuated hydraulic jack comprising a piston rod 31 supported in a cylinder 32 below ground level. The base wall or floor 24 of first ramp section 12 extends inwardly from pivot 27 the full length of the ramp. This ramp can be raised from its lowermost position shown in broken lines in Fig. 2 to above the horizontal position shown in full lines. When in the lowered position clearance must be provided for the slant ended side walls 23 and shortened roof 25 so they terminate at their outer ends along dotted line 29 and upper wall or roof 25 extends from line 29 inwardly. For the purpose of reducing the amount of horizontal thrust against the hydraulic jack the weight of ramp 12 is partially or wholly counterbalanced by weights 28 which come to rest on a raised platform 33 when the ramp is elevated so that the turret end is approximately three feet below horizontal position. These weights are supported by cables 34 which pass over pulleys 35 and are secured to the floor 24 as shown at 36.

It will be seen that as the turret is raised, ramp 12 carried at its outer end on pivot 27 raises and its inner end travels inwardly on roller 26. Suitable weatherproof connections (not shown) are provided from the inner end of ramp 12 to the second floor of the airport terminal building.

The turret structure 30 (Fig. 7) comprises outer and inner concentric cylindrical housings 40 and 41. Housing 40, which does not rotate, is mounted on a base 42 carried at the upper end of piston rod 31. Pivot 27 is secured to this outer housing and the latter is formed with an opening 43 through which the passengers walk to or from first ramp 12. The outer housing is closed by a roof 44 and a similar roof 49 may be added to provide structural stability at the upper end of housing 41.

Because of the cut-away side walls 29 (Fig. 2) of ramp 12 the open space is closed by means of triangular side walls 45 secured to outer housing 40 and an inverted U-shaped hood 46 is pivotally secured to the housing at 47. This hood raises and lowers with the movement of first ramp 12, and keeps the opening at the end of roof 25 covered.

The arrangement of the side wall openings in the turret members 40—41 is shown schematically in Figs. 8 and 9. In addition to opening 43 for ramp 12 there is an opening 51 extending around about 180° of the outer periphery of housing 40 which permits second ramp 14 attached to housing 41 of turret to rotate from its innermost position of Fig. 8 to its maximum outward position of Fig. 9.

The inner housing 41 has an opening 52 to receive ramp 14, which is attached to housing 41 by hinge 37 (Fig. 7). On its opposite side housing 41 has a second opening 53 which becomes aligned generally with outer housing opening 43 when the second ramp is swung radially outwardly. It will be noted that opening 53 is wider than opening 43. This permits outer ramp 14 to be swung over a relatively wide arc and still permit unobstructed access from inner ramp 12 to the turret. Between these openings there is a third and smaller opening 54 through which the operator may travel to the control panel when the ramp structure is to be moved to operative position relative to the aircraft. This opening is arranged to be closed by a gravity operated fire-door type of closure 56.

In Figs. 2 and 7, second ramp 14 is attached to a mating extension of inner housing 41 by means of horizontal pivot 37. The walls of the second ramp 14 and the mating extension of inner housing 41 are connected by a weather-tight bellows structure 38. The side walls and upper roof section of second ramp 14 and the mating extension of inner housing 41 are cut away in V-section from hinge pivot 37 upward to the roof so that second ramp 14 may have limited vertical movement about pivot 37 should hydraulic jacks 31 and 85 (Fig. 6) not operate at exactly the same rate of vertical movement.

In Fig. 10 outer cylindrical housing 40 is mounted on base 42 which is rigidly supported at its center on piston rod 31 (Fig. 7). A ring 61 is secured to the inner surface of outer housing 40 and a plurality of shafts 62 are secured to the ring and extend radially inwardly therefrom. Rollers 63 are journalled on each shaft and support a rotatable annular channel 64 upon which floor 65 carrying cylinder 41 is secured. Floor 65 extends outwardly to support hinge 37 carrying second ramp 14. Inner housing 41 is secured on the upper surface of floor 65.

In Fig. 6 the outer end of second ramp 14 (Fig. 5) is supported for arcuate travel on a carriage or dolly structure comprising an elongated base 70 which may be fabricated or cast from metal in a single piece and has vertical slots 71 extending inwardly from opposite ends which receive wheels 72 provided with resilient tires. The wheels are journalled on shafts 73. There is also provided a central slot 74 receiving a third wheel 75 mounted on a shaft 76.

In another version of this invention, standard railroad type flanged wheels (not shown) running on curved rails suitably installed flush with or slightly above the concrete apron surface 13 (Fig. 1) of the airport may be substituted for wheels with resilient tires. In this latter version the radius rods 80 (Fig. 1) and their connecting elements would not be needed or used.

The axis of this third wheel 75 is perpendicular to the major axis of the dolly whereas the axes of wheels 72 are disposed at an angle thereto so that when the ramp is moved in its arcuate path the wheels traverse an arc centered on hydraulic jack 31 (Fig. 7). In order to accurately define the path of travel of the dolly (Fig. 2) radius rods 80 are pivotally secured (Fig. 5) at one end to plates 81 secured at the ends of the dolly and at their opposite ends are secured to a freely rotatable collar 82 above the top flange or head of hydraulic cylinder of turret jack 32 (Fig. 2).

On each side of central vertical slot 74 there is provided a well 83 and at the outer ends of the wells there are mounted hydraulic cylinders 84, carrying pistons 85 which are secured at their lower ends on dolly 70. Pistons 85 carry brackets 86 at their upper ends. A shaft 90 extends between these brackets and on shaft 90 plates 91 are pivoted at the top and are secured at their lower ends to the floor of ramp 14, thus providing some flexibility to accommodate slightly uncoordinated operation of jacks 85 and 31 (Fig. 2).

In Fig. 5 a reduction geared motor 92 drives wheel 72 and a bracket 93 supports a tank, motor and pump (not shown) for the hydraulic pressure required by jacks 85.

In Fig. 5 the floor of second ramp 14 carries two outwardly projecting H beams 96 and at the outer ends of these H beams a curved channel 97 is rigidly secured which forms a sliding support over which is cantilevered pivoted ramp section 16. The structure is further reinforced by cross pieces 100 between the circular channel 97 and H beams 96. Pivoted section 16 includes a base wall 101, side walls 102 which are curved at 103 and are engaged on their outer surfaces by curved walls 104 at the outer ends of second ramp 14. It also includes a top wall 105 (Fig. 4). This pivoted extension 16 is rotatable about and secured at the outer end of ramp 14 by a pivot pin 106. A reduction geared motor 107 suitably supported by H beams 96 is employed for rotating the ramp to a desired position by means of pinion 108 and gear segment 109.

The extensible floor of third ramp 16 is formed with a movable floor 110 (Figs. 4, 5 and 6), having longitudinally disposed spaced floor members or fingers 111 which receive in telescopic relation therebetween fixed floor members 112 attached to a fixed floor section 113. The movable floor section is supported by channels 114 (Figs. 5 and 6) which ride between rollers 115 (Figs. 4 and 6) which rotate on pins 115a (Fig. 4) carried by channels 116 (Figs. 4 and 5). At the outer end of the floor channels 114 (Fig. 6) there is secured a transverse channel 120 (Fig. 4) and a roller 121 is journalled just inside this channel, over which a flexible belt 122 carrying carpet material as used throughout the ramp structure passes to provide a smooth floor and to cover the openings between fixed and movable telescopic fingers. This belt is secured at its inner and upper end to a bar 125 carried by angle 146 and at its opposite end under the floor structure it is secured to a spring 130 fixed at its opposite end to angle 146. Thus, as the floor moves outwardly the belt and carpet extend over the upper face of the floor. The movable floor section 110 with attached fingers 111 is moved by a piston rod 131 carried in cylinder 132 and secured at its opposite end to an angle 133 carried by a channel 134. When section 110 is moved outwardly, the plane wall is actually contacted by a resilient tube 135 secured to channel 120, which tube has been omitted in Fig. 6.

Extensible ramp hood 17 (Fig. 4) includes side walls 140 attached to a top wall 141, all slidable on side and top walls 102—105 of pivoted third ramp section 16. Suitable windows (not shown) will be provided on walls 102 with similar windows (matching in retracted position) on walls 140 for the convenience of operator using control panel 150. A resilient tube 142 is secured to the outer ends of side walls 140 and extends along the outer edge of top wall 141 as shown at 143. These resilient tubes will conform to variations in fuselage body shapes and will provide a weather-tight closure between extensible ramp hood 17 and a wide variety of aircraft. Cylinders 144 carried by walls 102 have pistons whose outer ends are secured to walls 140 to extend or retract this extensible ramp hood 17.

Control of each of the separate movements of all of the several ramps and their sections is concentrated in a control panel 150 (Fig. 4) located to give maximum point of contact visibility to the operator. The required conjoint operation of the hydraulic jack 31 and the two hydraulic jacks 85 (Fig. 2) controlling the elevation of the ramps is obtained by adjacent control switches 151, 152 and 153 and level indicator 154, the latter enabling the operator to elevate the second ramp 14 without deviation from a horizontal plane exceeding the flexibility limits of the structure.

Third ramp 16 (Fig. 4) is provided with roll-up type door 147 to permit closing outer ends of the ramp structure against weather when the apparatus is not in service.

It will be appreciated that operation of the extensible portions of this apparatus is not limited to any specific means such as a motor or hydraulic jack since it is quite feasible to employ either or both as desired. Also the ramps 12 and 14 can be raised by a motor driven screw or by a screw and/or toggle lever system combined in place of hydraulic jacks 31 and 85 (Fig. 2).

It will be apparent from Fig. 2 that when the first ramp is in the lowered position shown in dotted lines service vehicles can easily pass under the ramp. Also by providing the hinge connection between the first and second ramps with the turret no damage will occur if the opposite ends of the second ramp are not raised and lowered at precisely the same speed. The essential thing is that the second ramp will be substantially horizontal at all times and this is also true of the third ramp which is horizontally aligned with the second ramp at all times. The independently movable floor section may be positioned 8 to 10 inches below the bottom sill of the door which prevents passengers from bumping their heads against the upper edge of the door opening when passing through an aircraft door.

The great flexibility of the apparatus is indicated by the fact that the distance between the two ramp structures is such as to take care of two-door planes having a wide range of distance between these openings and the two ramp structures can be simultaneously used for two planes of the smaller variety having only a single door.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What we claim is:

1. The combination with an airport terminal having an elevated loading and unloading opening, of first and second ramps, a turret structure connecting the ramps, a mobile unit supporting the outer end of the second ramp to allow arcuate travel of the second ramp with the turret as the center of rotation, and a pivoted, extensible third ramp carried at the outer end of the second ramp adapted to contact the aircraft, power driven means on the mobile unit for raising and lowering the outer end of the second ramp, power driven means for raising and lowering the turret structure, and means for operating said power driven means conjointly, the turret structure comprising an outer circular housing fixed on the power driven means for raising and lowering the turret structure and provided with pivot means connecting the outer end of the first ramp, and an inner concentric, rotatable circular housing carried in the outer housing and connecting by pivot means to the inner end of the second ramp, the terminal opening having means at its lower end supporting the inner end of the first ramp in sliding relation as its outer end raises and lowers, the concentric side walls of the turret housings having access openings generally opposite the ramps to which they are connected including an opening in the outer housing of sufficient length to permit rotation of the inner housing of at least 100° when the second ramp is rotated.

2. An apparatus according to claim 1 wherein the outer turret housing is provided at its lower end with spaced rollers carried on radially disposed shafts and the inner housing carries an annular channel at its lower end which receives the rollers to permit free rotation of said inner housing.

3. An apparatus according to claim 1 wherein the mobile unit comprises a base provided with wheels whose axes are in fixed alignment with the turret center.

4. An apparatus according to claim 1 wherein the outer end of the first ramp is provided with top and side walls which are cut away sufficiently to permit maximum downward travel of said end, and a hood forming a protective canopy over said cut-away sections when said outer end is in a generally horizontal position, said hood being horizontally pivoted at the upper end of the outer turret housing and extending the full length of the opening formed by said cut-away walls.

5. An apparatus according to claim 1 wherein the side wall openings in the turret housings include an opening in the outer housing leading into the first ramp and a somewhat longer opening in the inner housing which is aligned with said outer housing opening in a plurality of extended service positions of the second ramp.

6. The combination with an airport terminal having an elevated loading and unloading opening, of a closed passenger ramp structure including first and second ramps, a turret provided with inner and outer sections which are rotatable relative to each other, each of said ramps being connected by a horizontal pivot with one of said turret sections, a mobile unit at the outer end of the second ramp to allow arcuate horizontal travel of the second ramp relative to the first ramp with the turret as the center of rotation, and a pivoted, extensible third ramp carried at the outer end of the second ramp adapted to contact the aircraft, means on the mobile unit for raising and lowering the outer end of the second ramp and independent means for raising and lowering the turret, and power means for operating the mobile unit to move the second ramp from inoperative position to extended position.

7. An apparatus according to claim 6 wherein pivotal means are provided for connecting the first and second ramps with the turret.

8. An apparatus according to claim 6 wherein the pivoted extensible third ramp is provided with independently movable floor and wall sections whose outer ends engage the aircraft.

9. An apparatus according to claim 6 wherein the second ramp is substantially level at all times and a vertical pivot connecting the second and third ramps whereby the outer end of the third ramp can be swung to a position perpendicular with the aircraft fuselage.

10. The combination with an airport terminal having an elevated loading and unloading opening, of first and second passenger ramps, a turret connecting the ramps, a mobile unit at the outer end of the second ramp and supporting the same and provided with wheels to allow arcuate travel of the second ramp with the turret as the center of rotation, and a pivoted third ramp carried at the outer end of the second ramp, an extensible floor at the outer end of the third ramp for contacting the aircraft, and an independently movable extensible hood enclosing the area above the extensible floor, a pair of hydraulic jacks on the mobile unit for raising and lowering said outer end of the second ramp, a single hydraulic jack for raising and lowering the turret, a means for operating all three jacks conjointly, the turret comprising an outer circular housing fixed on the single jack and provided with pivot means connecting the outer end of the first ramp, and an inner concentric, rotatable circular housing connecting by pivot means to the inner end of the second ramp, the airport terminal opening having a roller at its lower end supporting the inner end of the first ramp in sliding relation as its outer end raises and lowers, the side walls of the turret housings having openings for the ramp connections including an opening in the outer housing of sufficient length to permit rotation of the inner housing of at least 100° with second ramp attached, and a motor for driving the wheels of the mobile unit under the outer end of the second ramp, the pivoted third ramp, the extensible floor at the end of the third ramp and the extensible hood carried by the latter.

11. The combination with an airport terminal having an elevated loading and unloading opening, of first and second closed passenger ramps, a closed turret connecting the ramps, a mobile unit under the outer end of the second ramp and supporting the same and provided with wheels to allow arcuate travel of the second ramp with the turret as the center of rotation, and a closed pivoted third ramp carried at the outer end of the second ramp and extensible sections thereof for contacting the aircraft, resilient bumpers along the outer edge of said extensible sections, a pair of hydraulic jacks on the mobile unit for raising and lowering the turret, means for operating said jacks conjointly, the turret comprising an outer circular housing fixed on the third jack and provided with pivot means connecting the outer end of the first ramp, and an inner concentric, rotatable circular housing connecting by pivot means to the inner end of the second ramp, the terminal opening having a roller at its lower end supporting the inner end of the first ramp in sliding relation as the outer end of the first ramp raises and lowers, the side walls of the turret housings having openings for access from the ramps and including an opening in the outer housing of sufficient length to permit rotation of the inner housing of at least 100° with the second ramp attached to permit the second ramp to swing from a position generally parallel with the airport terminal outwardly to a wide range of plane engaging positions.

References Cited in the file of this patent

UNITED STATES PATENTS

| | | |
|---|---|---|
| 2,478,177 | Beutel et al. | Aug. 9, 1949 |
| 2,581,293 | Read et al. | Jan. 1, 1952 |
| 2,654,492 | Pressler | Oct. 6, 1953 |
| 2,688,761 | Good et al. | Sept. 14, 1954 |
| 2,700,169 | Henion | Jan. 25, 1955 |